(12) United States Patent
Kirchmeyer et al.

(10) Patent No.: US 7,053,174 B2
(45) Date of Patent: May 30, 2006

(54) POLYTHIOPHENES

(75) Inventors: Stephan Kirchmeyer, Leverkusen (DE); Klaus Wussow, Netphen (DE); Friedrich Jonas, Aachen (DE); Andreas Elschner, Mülheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/988,858

(22) Filed: Nov. 21, 2001

(65) Prior Publication Data

US 2002/0077450 A1 Jun. 20, 2002

(30) Foreign Application Priority Data

Nov. 22, 2000 (DE) ............... 100 58 116

(51) Int. Cl.
*C08G 75/00* (2006.01)

(52) U.S. Cl. ............ 528/377; 528/373; 528/391; 528/486; 528/487; 528/495; 528/503

(58) Field of Classification Search ........... 528/377, 528/373, 391, 486, 487, 495, 503
See application file for complete search history.

(56) References Cited

U.S. PATENT DOCUMENTS

| | | |
|---|---|---|
| 4,910,645 A | 3/1990 | Jonas et al. |
| 4,959,430 A | 9/1990 | Jonas et al. |
| 4,987,042 A | 1/1991 | Jonas et al. |
| 5,035,926 A | 7/1991 | Jonas et al. |
| 5,111,327 A | 5/1992 | Blohm et al. |
| 5,300,575 A | 4/1994 | Jonas et al. |
| 5,403,467 A | 4/1995 | Jonas et al. |
| 5,621,069 A | 4/1997 | Galvin-Donoghue et al. .... 528/379 |

FOREIGN PATENT DOCUMENTS

| | | |
|---|---|---|
| DE | 4226757 | 2/1994 |
| DE | 19841804 | 3/2000 |

OTHER PUBLICATIONS

Lee Y et al: "Synthesis and Characterization of a Soluble and Transparent Conducting Polymer<Poly (3,4-Ethylenedioxythiophene)" Molecular Crystals and Liquid Crystals, Gordan and Breach, London, GB Bd. 327, 1999, Seiten 237-240, XP001062592 ISSN: 0026-8941 *Tabelle 1*.

*Primary Examiner*—Duc Truong
(74) *Attorney, Agent, or Firm*—Joseph C. Gil

(57) ABSTRACT

Polythiophenes which are soluble or dispersible in anhydrous or low-water-content solvents can be prepared if they are prepared in anhydrous or low-water-content solvents and a phase-transfer catalyst is added during the reaction.

12 Claims, No Drawings

POLYTHIOPHENES

CROSS REFERENCE TO RELATED PATENT APPLICATION

The present patent application claims the right of priority under 35 U.S.C. §119 (a)–(d) of German Patent Application No. 100 58 116.1, filed Nov. 22, 2000.

FIELD OF THE INVENTION

The invention relates to a process for the preparation of polythiophenes that are soluble or dispersible in anhydrous or low-water-content solvents, to polythiophenes obtainable by this process, and to the use of these polythiophenes.

BACKGROUND OF THE INVENTION

Organic, conductive polymers have become increasingly wide-spread in industry. Areas of application are, for example, the through-plating of circuit boards (EP 553 671 A1), the antistatic finishing of photographic films (EP 440 957 A2) or as electrode in solid-electrolyte capacitors (EP 340 512 A2). Particular importance has been achieved by poly-3,4-alkylenedioxythiophenes, which are distinguished by high stability and electrical conductivity.

EP 440 957 A2 describes water-soluble or water-dispersible polyalkylenedioxythiophenes. These are synthesized directly in the presence of polyanions in the aqueous phase. The aqueous preparations are employed for the production of conductive or antistatic coatings. For many applications, however, there is a need for polyalkylenedioxythiophenes which can be processed in the form of anhydrous or low-water-content solutions or dispersions, for example for shortening the drying times of the coatings or for improving the wetting behavior. After removal of the water from the solutions described in EP 440 957 A2, the solids obtained are insoluble in water and organic solvents.

EP 339 340 A2 describes the preparation of 3,4-polyalkylenedioxythiophenes by reaction of the corresponding monomers with oxidants. The 3,4-polyalkylenedioxythiophenes prepared in this way are likewise insoluble in organic and inorganic solvents.

EP 440 957 A2 teaches that the preparation of water-soluble or water-dispersible polyalkylenedioxythiophenes can in principle also be carried out in the presence of protic solvents, such as methanol, ethanol, isopropanol and other water-miscible organic solvents, such as, for example, acetone. However, only small amounts of organic solvents can be admixed here, and consequently anhydrous or low-water-content solutions or dispersions cannot be obtained in this way.

Polyalkylenedioxythiophenes are preferably prepared by oxidative polymerization. Known oxidants are transition metals, salt-like compounds and other oxidants. Preference is given here to the use of transition metals and salt-like oxidants, in particular alkali metal or ammonium peroxodisulfates.

Although there have been attempts to use transition metal-containing oxidants, such as iron(III) salts, for the polymerization of thiophenes in organic solvents, such as, for example, chloroform, acetonitrile and methanol, this is afflicted with difficulties and disadvantages. The polythiophenes prepared in this way are not or only partially dispersible in solvents or are only dispersible in solvents with the aid of further dispersion assistants (see in this respect, for example, Lee, S. Park and Y. Son, Mol. Cryst. Liq. Cryst. 327 (1999) 237–240). The transition metal-containing residues of the oxidants can only be removed from the reaction solutions with difficulty and have an adverse effect on the quality of the conductive or antistatic coatings, such as, for example, their ageing resistance.

Salt-like oxidants, such as peroxodisulfate or perborates, and other salt-like compounds only react very slowly if at all in the absence of water or in the presence of only small amounts of water, giving rise to unacceptably long reaction times when the reaction is carried out in low-water-content solvents. The reaction solutions obtainable in this way contain large amounts of monomers and virtually no polythiophenes and therefore cannot be used.

Surprisingly, it has now been found that polythiophenes of high quality that are readily soluble or dispersible in anhydrous or low-water-content solvents can be prepared if these are prepared in anhydrous or low-water-content solvents and phase-transfer catalysts are added during the reaction. The preparation process has the advantage that it is possible to prepare solvent-containing anhydrous or low-water-content polythiophene dispersions or solutions that have only low metal and salt contents after work-up. The polythiophenes prepared by the process according to the invention are stable on storage as a solid, dispersion or solution and are suitable for the production of conductive or antistatic layers of high quality.

SUMMARY OF THE INVENTION

The invention relates to a process for preparing polythiophenes comprising (1) reacting (a) one or more thiophenes of the general formula (I)

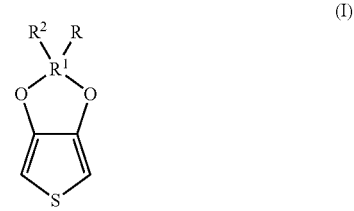

wherein $R^1$ is an unsubstituted or substituted alkylene or an alkenylene radical having from 1 to 10 carbon atoms, and R and $R^2$, independently of one another, are hydrogen, a linear or branched alkyl radical having from 1 to 20 carbon atoms, OH, O—$CH_2$—$CH_2$—$CH_2$—$SO_3H$ or O-alkyl having 1–18 carbon atoms, (b) at least one compound containing one or more sulfonic acid groups, (c) at least one oxidant, (d) at least one phase-transfer catalyst, and (e) optionally one or more catalysts, with (f) at least one anhydrous or low-water-content solvent at a temperature ranging from 0 to about 150° C., thereby forming a product, and (2) subsequently working up the product. The invention also relates to a polythiophene made with such a process as well as a conductive coating or an anti-static coating made with such a polythiophene. These and other features, aspects, and advantages of the present invention will become better understood with reference to the following description and appended claims.

DETAILED DESCRIPTION OF THE INVENTION

With the same chemical composition, the polythiophenes according to the invention surprisingly differ significantly from polythiophenes prepared in accordance with the state of the art. The polythiophenes according to the invention dissolve spontaneously in solvents and also water, even in high concentrations, without precipitations, swelling or other undesired effects, such as, for example, an increase in the viscosity, occurring.

This was surprising and unforeseeable for the person skilled in the art since the person skilled in the art had to assume that the polymerization reaction of identical thiophene starting materials using the identical oxidant should lead to products having known properties, and the addition of phase-transfer catalysts should merely increase the reaction rate during the polymerization. However, this is not the case. The polythiophenes according to the invention dissolve spontaneously in water and organic solvents.

The invention therefore relates to a process for the preparation of polythiophenes in which
a) one or more thiophenes of the general formula (I)

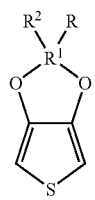
(I)

in which $R^1$ is an unsubstituted or substituted alkylene or alkenylene radical having from 1 to 10 carbon atoms, and R and $R^2$, independently of one another, are hydrogen, a linear or branched alkyl radical having from 1 to 18 carbon atoms, OH, O—$CH_2$—$CH_2$—$CH_2$—$SO_3H$ or O-alkyl having 1–18 carbon atoms,
   a) at least one compound containing one or more sulfonic acid groups,
   b) at least one oxidant,
   c) at least one phase-transfer catalyst, and
   d) if desired one or more catalysts,
are reacted in at least one anhydrous or low-water-content solvent at temperatures of from 0 to 150° C., and the product is subsequently worked up.

The invention also relates to the polythiophenes that can be prepared by this process.

Finally, the invention relates to the use of the polythiophenes prepared in accordance with the invention, for example in the form of solids, dispersions or solutions, for the production of conductive and/or antistatic coatings and moldings.

The process according to the invention is preferably carried out using thiophenes of the general formula (II) or (III)

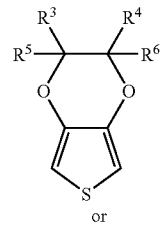
(II)

or

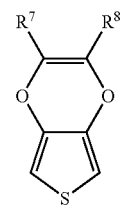
(III)

where
$R^3$, $R^4$, $R^5$, $R^6$, $R^7$ and $R^8$ are each, independently of one another, a hydrogen atom, an alkyl group having from 1 to 20 carbon atoms, a hydroxymethyl group, or an alkoxymethyl group (R—O—$CH_2$—) having from 1 to 20 carbon atoms which is unsubstituted or substituted by sulfonic acid groups.

The thiophenes employed in the process according to the inventionare particularly preferably thiophenes of the general formula (IV)

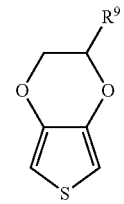
(IV)

where
$R^9$ is hydrogen or an alkyl radical having from 1 to 20 carbon atoms.

Very particularly suitable thiophenes which may be mentioned are the following: 3,4-methylenedioxythiophene, 3,4-ethylenedioxythiophene, 3,4-propylenedioxythiophene, thiophenes carrying hydroxyl or alkoxy groups, as described, for example, in U.S. Pat. No. 5,111,327, and thiophenes carrying [—$CH_2$—O—$(CH_2)_n$—$SO_3H$] groups.

Suitable compounds containing one or more sulfonic acid groups are compounds that carry at least one sulfonic acid linked to an aliphatic, cycloaliphatic or aromatic carbon atom. These are preferably polysulfonic acids, for example polystyrenesulfonic acids and polyvinylsulfonic acids having a molecular weight (Mw) of from 2000 to 2,000,000, preferably from 5000 to 500,000, toluenesulfonic acids, benzenesulfonic acids, which may carry alkyl radicals having from 1 to 20 carbon atoms, for example dodecylbenzenesulfonic acid, alkylsulfonic acids having from 1 to 20 carbon atoms, for example methanesulfonic acid and laurylsulfonic acid. However, it is also possible, if desired, to use or additionally use compounds which carry an [—O—SO$_2$—OH] group (i.e. sulfuric acid monoesters).

Preferred oxidants are salt-like oxidants, preferably peroxodisulfates, for example alkali metal and ammonium peroxodisulfate, and percarbonates, such as alkali metal percarbonate.

Polythiophenes are prepared in accordance with the invention in the presence of a phase-transfer catalyst. Phase-transfer catalysts increase the solubility of the oxidants in the solvent. Examples of suitable phase-transfer catalysts are either compounds which complex alkali metal ions or are ionic compounds containing long-chain alkyl radicals which have a counterion which is soluble in the solvent and thus increase the solubility of the oxidants. Preferred phase-transfer catalysts are compounds containing —CH$_2$— and —O— structural units, for example crown ethers, such as, for example, 12-crown-4 or 18-crown-6, benzo- or dibenzo-18-crown-6, or polyethers prepared from ethylene oxide. Preference is likewise given to quaternary ammonium salts, particularly preferably quaternary ammonium salts containing alkyl radicals or arylalkyl radicals having from 4 to 20 carbon atoms, such as, for example, butyl-, decyl-, lauryl- or benzyltrimethylammonium salts, and corresponding phosphorus compounds.

If desired, one or more catalysts that increase the rate of polymerization are added in the process according to the invention. Examples of suitable catalysts are iron(III) or other transition-metal compounds, such as, for example, manganese salts. Examples which may be mentioned are iron(III) chloride, iron(III) sulfate, iron(III) toluenesulfonate, manganese dioxide and manganese(II) salts.

The process according to the invention is carried out in an anhydrous or low-water-content solvent. Suitable solvents are those which contain up to about 5% by weight of water. These solvents preferably contain less than about 2% by weight of water.

Suitable anhydrous or low-water-content solvents are in principle organic solvents. These are, for example, alcohols, for example methanol, ethanol, propanol, butanol, pentanol or higher alcohols, ethylene glycol, diethylene glycol, triethylene glycol or higher homologues, ketones, such as, for example, acetone or butanone, chlorinated hydrocarbons, for example methylene chloride, chloroform, tetrachloromethane, dichloroethane or trichloroethane, aromatic compounds, such as, for example, toluene, xylene, chlorobenzene or dichlorobenzene, aliphatic or cycloaliphatic hydrocarbons, such as, for example, pentane, hexane, heptane, cyclohexane and octane, ethers, such as, for example, tetrahydrofuran, diethyl ether, methyl tert-butyl ether, ethylene glycol mono- or dimethyl ether or higher homologues thereof, amides, such as, for example, dimethylformamide, dimethylacetamide or N-methylpyrrolidone, and esters, such as, for example, ethyl or butyl acetate.

The anhydrous or low-water-content solvents are preferably lower alcohols having from 1 to 8 carbon atoms, preferably methanol, ethanol, propanol, isopropanol, butanol and/or pentanol.

The process according to the invention is usually carried out by reacting, per mole of thiophene employed or mixture of a plurality of thiophenes employed, from about 0.1 to about 20 mole equivalents, preferably from about 0.2 to about 10 mole equivalents, particularly preferably from about 0.5 to about 5 mole equivalents, of sulfonic acid groups of the compound containing sulfonic acid groups, from about 0.9 to about 5.0 mole equivalents, preferably from about 1.0 to about 3.0 mole equivalents, particularly preferably from about 1.1 to about 2.0 mole equivalents, of the oxidant, where one equivalent of oxidant is capable of taking up two moles of electrons, from about 0.1 to about 10 mol %, preferably from about 1 to about 5 mol %, of phase-transfer catalyst, based on the oxidant, from 0 to about 10 mol % of catalyst (other than the phase-transfer catalyst), based on thiophene, and solvent in such an amount that the ratio between thiophene and solvent is from about 0.001 to about 0.1:1, at a temperature ranging from 0 to about 150° C., preferably from about 15 to about 70° C., particularly preferably from about 20 to about 40° C., and subsequently working up the reaction product.

The work-up preferably consists of the removal of ions remaining in the reaction mixture, i.e. preferably desalination. However, possible undesired secondary components can also be removed from the reaction solution during the work-up.

Possible work-up steps are, for example, filtration or decantation of the reaction solution, precipitation, washing and drying of the polythiophene and further purification steps which are usual and are known to the person skilled in the art. In many cases, however, it is advisable additionally to remove salts with the aid of ion exchanger resins known to the person skilled in the art or other special methods for selective removal of ions, for example with the aid of ion-selective membranes.

The polythiophenes prepared by the process according to the invention are stable on storage as a solid, dispersion or solution. The polythiophenes according to the invention can be used as dispersions or solutions for the preparation of electrically conductive or antistatic coatings. Suitable areas of application are the finishing of plastic films for the packaging of electronic components and for clean-room packaging, antistatic finishing of cathode ray tubes, antistatic finishing of photographic films, as transparent electrodes, for example for touch screens and organic or inorganic electroluminescent displays, for the production of capacitors, batteries, circuit boards or window panes which can be colored electrically.

Before production of the coatings, it is possible to add binders and/or crosslinking agents, such as polyurethanes or polyurethane dispersions, polyolefin dispersions, epoxysilanes, such as 3-glycidoxypropyltrialkoxysilane, to the polythiophene dispersions according to the invention. Furthermore, silane hydrolysates, for example based on tetraethoxysilane, can be added in order to increase the scratch resistance in coatings.

The coatings can be produced by known processes, such as spraying, gravure printing, offset printing, curtain coating, application via application rolls and brushing.

The invention is further described in the following illustrative examples in which all parts and percentages are by weight unless otherwise indicated.

EXAMPLES

EXAMPLE 1

Preparation of an Ethanolic Polystyrenesulfonic Acid Solution 400 ml of an aqueous solution of a polystyrenesulfonic acid having a molecular weight (Mw) of about 70,000 were evaporated to dryness and dissolved in 1000 ml of ethanol. The solids content of the solution was found to be 10.4% by weight.

EXAMPLE 2

Preparation of a Polythiophene According to the Invention in the Form of a Solution 133 ml of ethanol, 14.77 g (0.0256 mol) of iron(III) toluenesulfonate, 1399.76 g of the polystyrenesulfonic acid solution from Example 1, 3.7 g (0.014 mol) of 18-crown-6, 74.66 g (0.2765 mol) of potassium peroxodisulfate and 27.97 g (0.1967 mol) of 3,4-ethylenedioxythiophene were combined in a reactor and homogenized for 1 minute using a commercially available disperser (Ultra-Turrax® from IKA). A finely divided suspension was formed. The suspension was subsequently stirred at room temperature for 24 hours. The reactor contents became a dark-blue color during the reaction time. The reaction conversion was found to be 95.1% by analysis by gas chromatography.

EXAMPLE 3

Purification of a Polythiophene According to the Invention

The solution from Example 2 was filtered, 455 ml of cation exchanger (Lewatit® S 100, a strongly acidic ion exchanger containing sulfonate groups based on crosslinked polystyrene, commercial product from Bayer AG, Leverkusen) and 525 ml of anion exchanger (Lewatit® MP 62, a basic ion exchanger containing tertiary amino groups based on crosslinked polystyrene, commercial product from Bayer AG, Leverkusen) were added, and the mixture was stirred for 1 hour and filtered. A dark-blue, clear solution was obtained. A sample of this solution was diluted with ethanol to a solids content of 0.4% by weight, and a coating with a thickness of 60 μm was applied from the dilute solution to a plastic film (polyethylene terephthalate) with the aid of a hand coater and dried at 80° C. for 15 minutes. The thickness of the dry coating was about 240 nm. The surface resistance of the applied layer was 7 Mohm/square in accordance with IEC standard 93 (VDE 0303 Part 30) or ASTM D 257.

EXAMPLE 4

Purification and Isolation of the Polythiophene According to the Invention

A polythiophene solution was prepared as described in Example 2. The solution was filtered. 1500 ml of toluene were added to 1000 ml of the polythiophene solution with stirring, and the mixture was stirred for a further 15 minutes. A dark-blue precipitate was obtained, from which the clear supernatant liquid was decanted. The residue was washed twice with 100 ml of toluene each time, dried and powdered, giving 97 g of dark-blue/black powder.

EXAMPLE 5

Preparation of a Solution of the Polythiophene According to the Invention in Ethanol 10 g of the polythiophene powder from Example 4 were stirred in 90 ml of ethanol for 30 minutes. A dark-blue clear solution was obtained. The solution was filtered through a 0.2 μm filter. No filtration residue was obtained. The particle size distribution of the solution was measured by means of light scattering in an ultracentrifuge. The mean particle size was about 30 nm (d50).

A coating with a thickness of approximately 240 nm was produced from the solution as described in Example 3. The surface resistance of the applied layer was 6.7 Mohm/square in accordance with IEC standard 93 (VDE 0303 Part 30) or ASTM D 257.

EXAMPLE 6

Preparation of a Solution of the Polythiophene According to the Invention in Water 10 g of the polythiophene powder from Example 4 were stirred in 90 ml of water for 30 minutes. A dark-blue clear solution was obtained. The solution was filtered through a 0.2 μm filter. No residue was obtained. The particle size distribution of the solution was measured by means of light scattering in an ultracentrifuge. The mean particle size was about 30 nm (d50).

A coating with a thickness of approximately 240 nm was produced from the solution as described in Example 3. The surface resistance of the applied layer was 5.2 Mohm/square in accordance with IEC standard 93 (VDE 0303 Part 30) or ASTM D 257.

COMPARATIVE EXAMPLE 1

Repetition of Example 2 Without Phase-Transfer Catalyst 133 ml of ethanol, 14.77 g (0.0256 mol) of iron(III) toluenesulfonate, 1399.76 g of the polystyrenesulfonic acid solution from Example 1, 74.66 g (0.2765 mol) of potassium peroxodisulfate and 27.97 g (0.1967 mol) of 3,4-ethylenedioxythiophene were combined in a reactor and homogenized for 1 minute using a commercially available disperser (Ultra-Turrax® from IKA). A finely divided suspension was formed. The suspension was subsequently stirred at room temperature for 24 hours. The reactor contents did not change color during the reaction time. After a reaction time of one week, the contents were slightly greenish. The reaction conversion was found to be 2.5% by analysis by gas chromatography.

Comparative Example 1 shows that without addition of phase-transfer catalysts, an adequate reaction rate is not achieved and virtually no polythiophene is obtained.

COMPARATIVE EXAMPLE 2

Repetition of Example 2 in Water 724 g of water, 14.77 g (0.0256 mol) of iron(III) toluenesulfonate, 808.75 g of a polystyrenesulfonic acid solution in water (Mw about 70,000 g/mol, 18% strength by weight in water), 3.7 g (0.014 mol) of 18-crown-6, 74.66 g (0.2765 mol) of potassium peroxodisulfate and 27.97 g (0.1967 mol) of 3,4-ethylenedioxythiophene were combined in a reactor and homogenized for 1 minute using a commercially available disperser (Ultra-Turrax® from IKA). A milky dispersion was formed which became a blue color after a few minutes. The dispersion was subsequently stirred and homogenized at room temperature for 24 hours. A highly viscous suspension containing coarse gel particles was formed. The gel particles were insoluble in ethanol.

The comparative example shows that the same reaction in water leads to a polythiophene which differs significantly in solubility from the polythiophene according to the invention.

COMPARATIVE EXAMPLE 3

Preparation of a Polythiophene of the Same Composition as in Example 2 of EP 440957 A2 in Water, But with a lower Solids Content 1588.13 g of water, 15.08 g of a 1 per cent strength by weight aqueous iron(III) sulfate solution, 359.79 g of a polystyrene sulfonic acid solution in water (Mw about 70,000 g/mol, 5.5% strength by weight in water) and 8.02 g (0.056 mol) of 3,4-ethylenedioxythiophene were introduced into a reactor at room temperature and homogenized for 15 minutes using a commercially available disperser (Ultra-Turrax® from IKA). A milky suspension was formed. 19.24 g (0.081 mol) of sodium peroxodisulfate were added. After 10 minutes, the solution became a blue color. The dispersion was subsequently stirred and homogenized at room temperature for 24 hours. A dark-blue, slightly viscous solution was formed. 106.65 g of cation exchanger (Lewatit® S 100, a strongly acidic ion exchanger containing sulfonate groups based on crosslinked polystyrene, commercial product from Bayer AG, Leverkusen) and 160.6 g of anion exchanger (Lewatit® MP 62, a basic ion exchanger containing tertiary amino groups based on crosslinked polystyrene, commercial product from Bayer AG, Leverkusen) were added to this solution, and the mixture was stirred for 30 minutes. The ion exchanger was subsequently filtered off through an 8 μm filter. As described in Example 3, a coating with a thickness of approximately 240 nm was produced from the solution. The surface resistance of the applied layer was 2.5 Mohm/square in accordance with IEC standard 93 (VDE 0303 Part 30) or ASTM D 257.

10 ml of the solution were dried and powdered. The resultant powder was not soluble in either water or ethanol.

The comparative example shows that aqueous polythiophene solutions can be prepared in accordance with the prior art, but they differ in solubility from the polythiophenes according to the invention.

Although the present invention has been described in detail with reference to certain preferred versions thereof, other variations are possible. Therefore, the spirit and scope of the appended claims should not be limited to the description of the versions contained therein.

What is claimed is:

1. A process for preparing polythiophenes comprising
   (1) reacting
      (a) one or more thiophenes of the general formula (I)

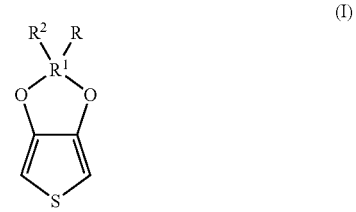

wherein $R^1$ is an unsubstituted or substituted alkylene or an alkenylene radical having from 1 to 10 carbon atoms, and R and $R^2$, independently of one another, are hydrogen, a linear or branched alkyl radical having from 1 to 20 carbon atoms, OH, O—$CH_2$—$CH_2$—$CH_2$—$SO_3H$ or O-alkyl having 1–18 carbon atoms, (b) at least one compound containing one or more sulfonic acid groups,
   (c) at least one oxidant selected from the group consisting of alkali metal peroxodisulfate, ammonium peroxodisulfate and alkali metal percarbonate,
   (d) at least one phase-transfer catalyst, and
   (e) optionally one or more catalysts, other than the at least one phase-transfer catalyst (d) with
   (f) at least one anhydrous or low-water-content solvent at a temperature ranging from 0 to about 150° C., thereby forming a product, and
   (2) subsequently working up the product.

2. The process according to claim 1, wherein the thiophene of the formula (I) is a thiophene of the general formula (II) or (III)

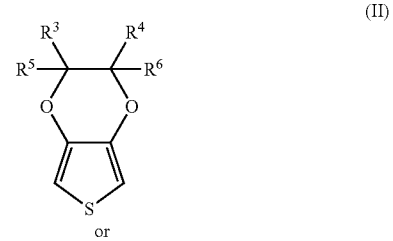

or

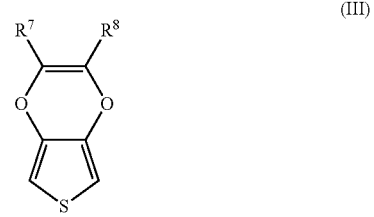

wherein $R^3$, $R^4$, $R^5$, $R^6$, $R^7$ and $R^8$ are hydrogen atoms, alkyl groups having from 1 to 20 carbon atoms, a hydroxymethyl groups, or alkoxymethyl groups having from 1 to 20 carbon atoms which are unsubstituted or substituted by sulfonic acid groups.

3. The process according to claim 1, wherein the thiophene of the formula (I) is a thiophene of the formula (IV)

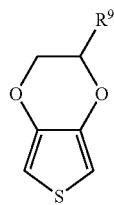

wherein $R^9$ is hydrogen or an alkyl radical having from 1 to 20 carbon atoms.

4. The process according to claim 1, wherein the compound containing one or more sulfonic acid groups is at least one compound selected from the group consisting of polystyrenesulfonic acids and alkylbenzenesulfonic acids having an alkyl group containing 1–20 carbon atoms.

5. The process according to claim 1, wherein the oxidant is at least one compound selected from the group consisting of ammonium peroxodisulfate, sodium peroxodisulfate and potassium peroxodisulfate.

6. The process according to claim 1, wherein the phase-transfer catalyst is at least one compound selected from the group consisting of crown ethers and quaternary ammonium salts, wherein the ammonium salts have at least one hydrocarbon radical having at least 4 carbon atoms.

7. The process according to claim 1, wherein the solvents are lower alcohols having from 1 to 8 carbon atoms.

8. The process of claim 7, wherein the solvents are selected from the group consisting of methanol, ethanol, propanol, isopropanol, butanol and pentanol.

9. The process according to claim 1, wherein the process is carried out by reacting:

(a) from about 0.1 to about 20 mole equivalents of sulfonic acid groups of the compound containing sulfonic acid groups, per mole of thiophenes, (b) from about 0.9 to about 5.0 mole equivalents of an oxidant, per mole of thiophenes, (c) from about 0.1 to about 10 mol % of a phase-transfer catalyst, based on the oxidant, wherein the ratio of the thiophenes and solvent is from about 0.001 to about 0.1:1, (d) from 0 to about 10 mol % of a catalyst, other than the phase-transfer catalyst, based on thiophene, wherein the ratio of the thiophenes and solvent is from about 0.001 to about 0.1:1.

10. A polythiophene obtained with the process of claim 1, wherein the polythiophene is a solid, a dispersion or a solution.

11. The polythiophene of claim 10, wherein the polythiophene is a conductive coating or an anti-static coating.

12. The process of claim 1 wherein the thiophene of formula (I) is a thiophene represented by the following general formula (III),

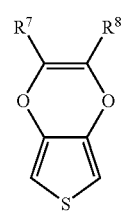

wherein $R^7$ and $R^8$ are each independently selected from the group consisting of hydrogen atoms, alkyl groups having from 1 to 20 carbon atoms, hydroxymethyl groups, alkoxymethyl groups having from 1 to 20 carbon atoms, and alkoxymethyl groups having from 1 to 20 carbon atoms which are substituted by sulfonic acid groups.

* * * * *